US012542114B2

(12) United States Patent
Takahashi

(10) Patent No.: US 12,542,114 B2
(45) Date of Patent: Feb. 3, 2026

(54) DISPLAY DEVICE SUPPRESSING DETERIORATION OF DISPLAY QUALITY DUE TO RESISTANCE INCREASE OF WIRING LINES

(71) Applicant: Sharp Display Technology Corporation, Kameyama (JP)

(72) Inventor: Yoshihisa Takahashi, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/771,700

(22) Filed: Jul. 12, 2024

(65) Prior Publication Data

US 2025/0078773 A1 Mar. 6, 2025

(30) Foreign Application Priority Data

Aug. 28, 2023 (JP) ................................ 2023-138101

(51) Int. Cl.
*G09G 3/36* (2006.01)

(52) U.S. Cl.
CPC ... *G09G 3/3677* (2013.01); *G09G 2310/0286* (2013.01); *G09G 2320/0233* (2013.01); *G09G 2320/041* (2013.01)

(58) Field of Classification Search
CPC ...... G09G 3/36; G09G 3/3611; G09G 3/3614; G09G 3/3622; G09G 3/3625; G09G 3/3633; G09G 3/364; G09G 3/3644; G09G 3/3648; G09G 3/3651; G09G 3/3655; G09G 3/3659; G09G 3/3666; G09G 3/3674; G09G 3/3677; G09G 3/3681; G09G 3/3688; G09G 3/3692; G09G 3/3691; G09G 2310/0286
USPC .................................................. 345/87–104
See application file for complete search history.

(56) References Cited

U.S. PATENT DOCUMENTS

2007/0229433 A1* 10/2007 Jang ..................... G09G 3/3677 345/96
2008/0284698 A1* 11/2008 Lee ........................ G11C 19/28 345/204
2009/0295784 A1* 12/2009 Kwon .................. G09G 3/3614 345/215
2010/0164854 A1* 7/2010 Kim ..................... G09G 3/3677 257/E21.602
(Continued)

FOREIGN PATENT DOCUMENTS

WO 2018/055769 A1 3/2018

*Primary Examiner* — Ke Xiao
*Assistant Examiner* — Nelson Lam
(74) *Attorney, Agent, or Firm* — ScienBiziP, P.C.

(57) ABSTRACT

A display device includes pixels arranged in a matrix, scanning signal lines, display signal lines, a scanning signal line driving circuit, a display signal line driving circuit, and input signal lines for supplying an input signal to the scanning signal line driving circuit. The scanning signal line driving circuit includes a shift register circuit, and each stage of the shift register circuit includes an input terminal connected to the input signal line via a branch line and an output terminal connected to the scanning signal line. The input signal line includes unit portions when a portion between the adjacent branch lines is defined as a unit portion, and the unit portions include at least one first unit portion each having a resistance value smaller than a resistance value of the unit portion adjacent thereto on a downstream side in an input direction of the input signal.

9 Claims, 6 Drawing Sheets

(56) References Cited

U.S. PATENT DOCUMENTS

| | | | | |
|---|---|---|---|---|
| 2015/0379951 | A1* | 12/2015 | Zeng | G09G 3/3681 345/92 |
| 2016/0335949 | A1* | 11/2016 | Lin | G09G 3/2085 |
| 2017/0309242 | A1* | 10/2017 | Kim | G02F 1/133345 |
| 2019/0311689 | A1 | 10/2019 | Takahashi | |
| 2023/0005445 | A1* | 1/2023 | Liu | G11C 19/28 |

* cited by examiner

DISPLAY DEVICE SUPPRESSING DETERIORATION OF DISPLAY QUALITY DUE TO RESISTANCE INCREASE OF WIRING LINES

BACKGROUND

1. Field

The present disclosure relates to an active matrix display device in which a scanning signal line driving circuit for supplying a scanning signal for selecting a pixel row is integrally provided on an active matrix substrate of a display panel.

2. Description of the Related Art

For example, in a so-called gate-on-array (GOA) liquid crystal display device, a gate driving circuit is integrally provided on an active matrix substrate of a liquid crystal display panel. As a liquid crystal display device becomes larger and/or has a higher resolution, there is a problem of deterioration in display quality due to an increase in wiring line resistance in a gate driving circuit of a GOA liquid crystal display device. For example, a voltage level of a gate signal and/or a waveform of a gate-on pulse varies in response to the wiring line resistance, and as a result, for example, a brightness unevenness in display is visually recognized.

Therefore, for example, a liquid crystal display device described in International Publication No. 2018-055769 includes a driving circuit capable of equalizing a waveform of a driving signal. The driving circuit includes a plurality of shift registers having an input terminal, an output terminal, and a switching element connected between the input terminal and the output terminal, in which the input terminal of each shift register is connected to a plurality of branch points on an input signal line disposed on the display panel, the output terminal of each shift register is connected to a plurality of output signal lines disposed on the display panel, and a predetermined driving signal is output from the output terminal based on a predetermined signal input via the input terminal of each shift register. In this drive circuit, in all or some of the plurality of shift registers, a resistance value between the input terminal and the output terminal when the switching element is in an ON state varies depending on the position of the branch point to which the input terminal is connected.

It is desirable to provide a novel display device capable of suppressing deterioration in display quality due to an increase in resistance of a wiring line for supplying an input signal to a scanning signal line driving circuit.

SUMMARY

According to an embodiment of the disclosure, a display device is provided as described below.

A display device includes a plurality of pixels arranged in a matrix having a plurality of pixel rows and a plurality of pixel columns, a plurality of scanning signal lines each of which is associated with one of the plurality of pixel rows, a plurality of display signal lines each of which is associated with one of the plurality of pixel columns, a scanning signal line driving circuit that supplies a scanning signal including a selecting pulse for selecting one of the plurality of pixel rows to the plurality of scanning signal lines, a display signal line driving circuit that supplies a display signal to the plurality of display signal lines, and a plurality of input signal lines that supply an input signal to the scanning signal line driving circuit, in which the scanning signal line driving circuit includes a shift register circuit, the shift register circuit includes a plurality of stages, each of the plurality of stages includes an input terminal connected to one of the plurality of input signal lines via a branch line and an output terminal connected to one of the plurality of scanning signal lines, the scanning signal line driving circuit is configured to sequentially apply the selecting pulse to the plurality of scanning signal lines in a scanning direction in response to the input signal, the scanning signal line driving circuit and the plurality of input signal lines are formed on the same substrate as the plurality of scanning signal lines, at least one input signal line of the plurality of input signal lines includes a plurality of unit portions when a portion between adjacent branch lines, each of which being the branch line connecting the input terminal to the one of the plurality of input signal lines, is defined as a unit portion, and the plurality of unit portions include at least one first unit portion each having a resistance value smaller than a resistance value of the unit portion adjacent thereto on a downstream side in an input direction of the input signal.

DESCRIPTION OF THE EMBODIMENTS

Figure 1:
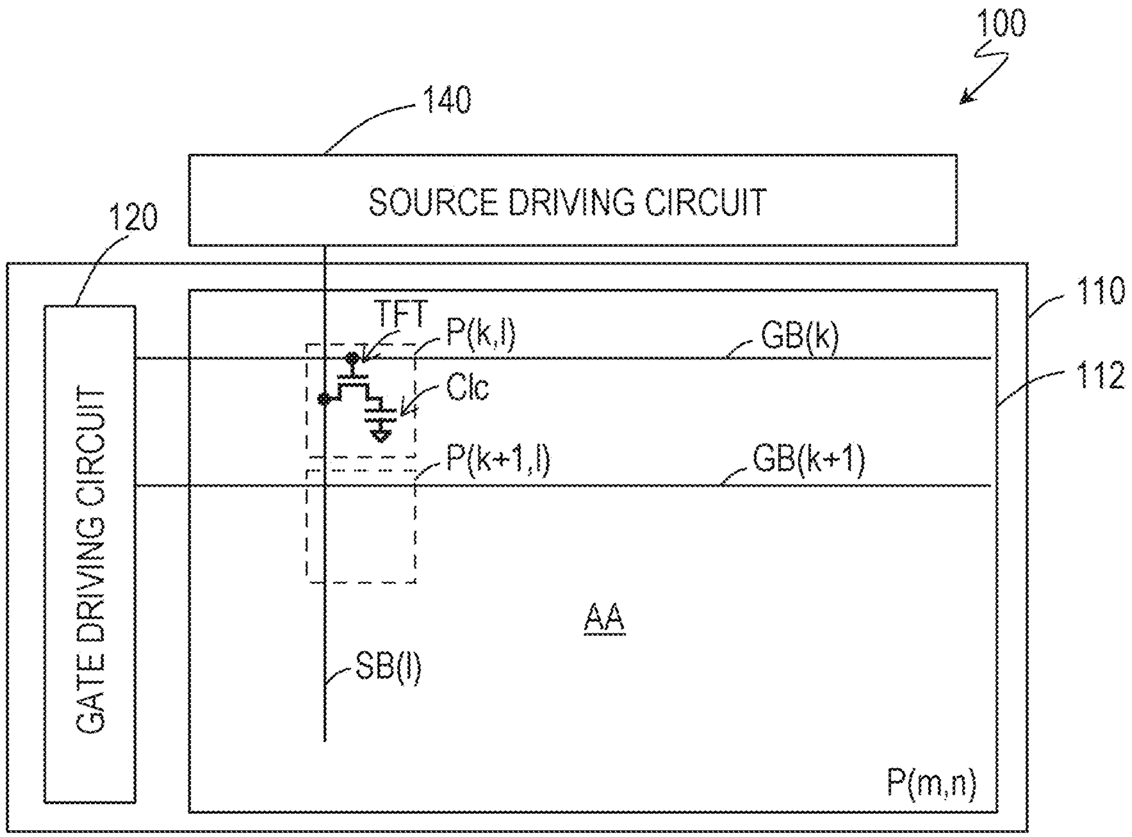
FIG. 1 is a schematic plan view of a liquid crystal display device according to an embodiment of the present disclosure.

A display device according to an embodiment of the present disclosure includes a plurality of pixels arranged in a matrix having a plurality of pixel rows and a plurality of pixel columns, a plurality of scanning signal lines each of which is associated with one of the plurality of pixel rows, a plurality of display signal lines each of which is associated with one of the plurality of pixel columns, a scanning signal line driving circuit that supplies a scanning signal including a selecting pulse for selecting one of the plurality of pixel rows to the plurality of scanning signal lines, a display signal line driving circuit that supplies a display signal to the plurality of display signal lines, and a plurality of input signal lines that supply an input signal to the scanning signal line driving circuit, in which the scanning signal line driving circuit includes a shift register circuit, the shift register circuit includes a plurality of stages, each of the plurality of stages includes an input terminal connected to one of the plurality of input signal lines via a branch line and an output terminal connected to one of the plurality of scanning signal lines, the scanning signal line driving circuit is configured to sequentially apply the selecting pulse to the plurality of scanning signal lines in a scanning direction in response to the input signal, the scanning signal line driving circuit and the plurality of input signal lines are formed on the same substrate as the plurality of scanning signal lines, at least one input signal line of the plurality of input signal lines includes a plurality of unit portions when a portion between adjacent branch lines is defined as a unit portion, and the plurality of unit portions include at least one first unit portion having a resistance value smaller than a resistance value of the unit portion adjacent thereto on a downstream side in an input direction of the input signal. Typically, the at least one first unit portion includes a plurality of first unit portions, and the first unit portion having a smaller resistance value is located further upstream in the input direction.

In the following description, an active matrix display device in which each pixel includes a TFT will be exemplified. In the active matrix display device according to the embodiment, each of the plurality of pixels includes a display medium layer, a pair of electrodes facing each other via the display medium layer, and a TFT having a drain electrode connected to one of the pair of electrodes. The plurality of scanning signal lines are a plurality of gate bus lines and the plurality of display signal lines are a plurality of source bus lines. A gate electrode of the TFT is connected to a gate bus line associated with the pixel row including a pixel having the TFT and a source electrode of the TFT is connected to a source bus line associated with the pixel column including a pixel having the TFT. The scanning signal line driving circuit is a gate driving circuit, and the scanning signal is a gate scanning signal including, as the selecting pulse, a gate-on pulse for turning on the TFT. The display signal line driving circuit is a source driving circuit, and the display signal is a source signal.

Hereinafter, an active matrix liquid crystal display device in which the display medium layer is a liquid crystal layer will be described with reference to the accompanying drawings. The liquid crystal display device according to the embodiment of the present disclosure is not limited to the following examples.

FIG. 1 illustrates a schematic plan view of a liquid crystal display device 100 according to an embodiment of the present disclosure.

The liquid crystal display device 100 includes a plurality of pixels P arranged in a matrix including a plurality of pixel rows (m rows) and a plurality of pixel columns (n columns). The liquid crystal display device 100 is an active matrix liquid crystal display device and includes a thin-film transistor (TFT) and a liquid crystal capacitor Clc for each pixel P. The pixel P may further include an auxiliary capacitor Cs (not illustrated) electrically connected in parallel to the liquid crystal capacitor Clc. For the sake of simplicity, a description of the auxiliary capacitor Cs is omitted. The liquid crystal capacitor Clc includes, for example, a pixel electrode (not illustrated) formed on an active matrix substrate 110 and a common electrode (also referred to as a counter electrode, not illustrated) facing the pixel electrodes via a liquid crystal layer. The common electrode is formed, for example, on a counter substrate 112 facing the active matrix substrate 110.

A region in which the plurality of pixels P are formed is referred to as an active area AA or a display area. A pixel in a k-th row and a l-th column among pixels arranged in m rows and n columns may be denoted by P(k, l). k, l, m, and n are positive integers satisfying relationships $1 \leq k \leq m$ and $1 \leq l \leq n$. For example, a so-called liquid crystal display device for full high-definition includes m=1080 and n=1920×3 (If a color display pixel is constituted by an R pixel, a G pixel, and a B pixel, a "single pixel" may be referred to as a "dot", and a "color display pixel" constituted by three "dots" may be referred to as a "pixel"). Each of the plurality of pixels includes a liquid crystal capacitor including a pixel electrode, and a TFT with a drain electrode connected to the pixel electrode.

The liquid crystal display device 100 further includes a plurality of gate bus lines GB (m lines) each associated with one of the plurality of pixel rows, and a plurality of source bus lines SB (n lines) each associated with one of the plurality of pixel columns. A gate electrode of the TFT included in each pixel is connected to a gate bus line GB associated with a pixel row including the pixel, and a source electrode of the TFT is connected to a source bus line SB associated with a pixel column including the pixel.

The liquid crystal display device 100 further includes a gate driving circuit 120 for supplying a gate scanning signal including a gate-on pulse GOP for turning on the TFTs to the plurality of gate bus lines GB, a source driving circuit 140 for supplying a source signal to the plurality of source bus lines SB, and a plurality of input signal lines 150 (see FIG. 2) for supplying an input signal to the gate driving circuit 120. Input signal lines for supplying an input signal to the source driving circuit 140 is not illustrated.

The liquid crystal display device 100 is of a GOA type, and the gate driving circuit 120 is formed on the active matrix substrate 110, similarly to the pixel electrodes, the TFTs, the plurality of source bus lines SB, and the plurality of gate bus lines GB. As is well known, in the active matrix substrate 110, for example, a conductive layer (metal layer), a semiconductor layer, and an insulating layer are formed on a glass substrate by a known method. For example, the source driving circuit 140 may be mounted on the active matrix substrate 110 as a source driving IC, or a flexible substrate on which a source driving IC is mounted may be connected to the active matrix substrate 110.

The gate driving circuit 120 and the source driving circuit 140 are controlled by a control circuit (not illustrated). The control circuit includes a display control circuit including a timing controller and a power supply circuit. The display control circuit supplies a necessary control signal to each of the gate driving circuit 120 and the source driving circuit 140, and the power supply circuit supplies a necessary power supply voltage to each of the gate driving circuit 120 and the source driving circuit 140. The gate driving circuit 120 supplies the gate scanning signal so as to sequentially apply a gate-on pulse GOP for turning on the TFT to the plurality of gate bus lines GB in a scanning direction. The source driving circuit 140 supplies the source signal to the plurality of source bus lines SB so that a gray scale voltage to be displayed by the pixel is applied to the pixel electrode connected to the TFT turned on by the gate-on pulse. Since the configuration and operation of the control circuit are well known, detailed descriptions thereof will be omitted. The embodiment according to the present disclosure is characterized by the plurality of input signal lines 150 for supplying an input signal from the control circuit to the gate driving circuit 120, and known configurations may be appropriately applied to other configurations.

Figure 2:
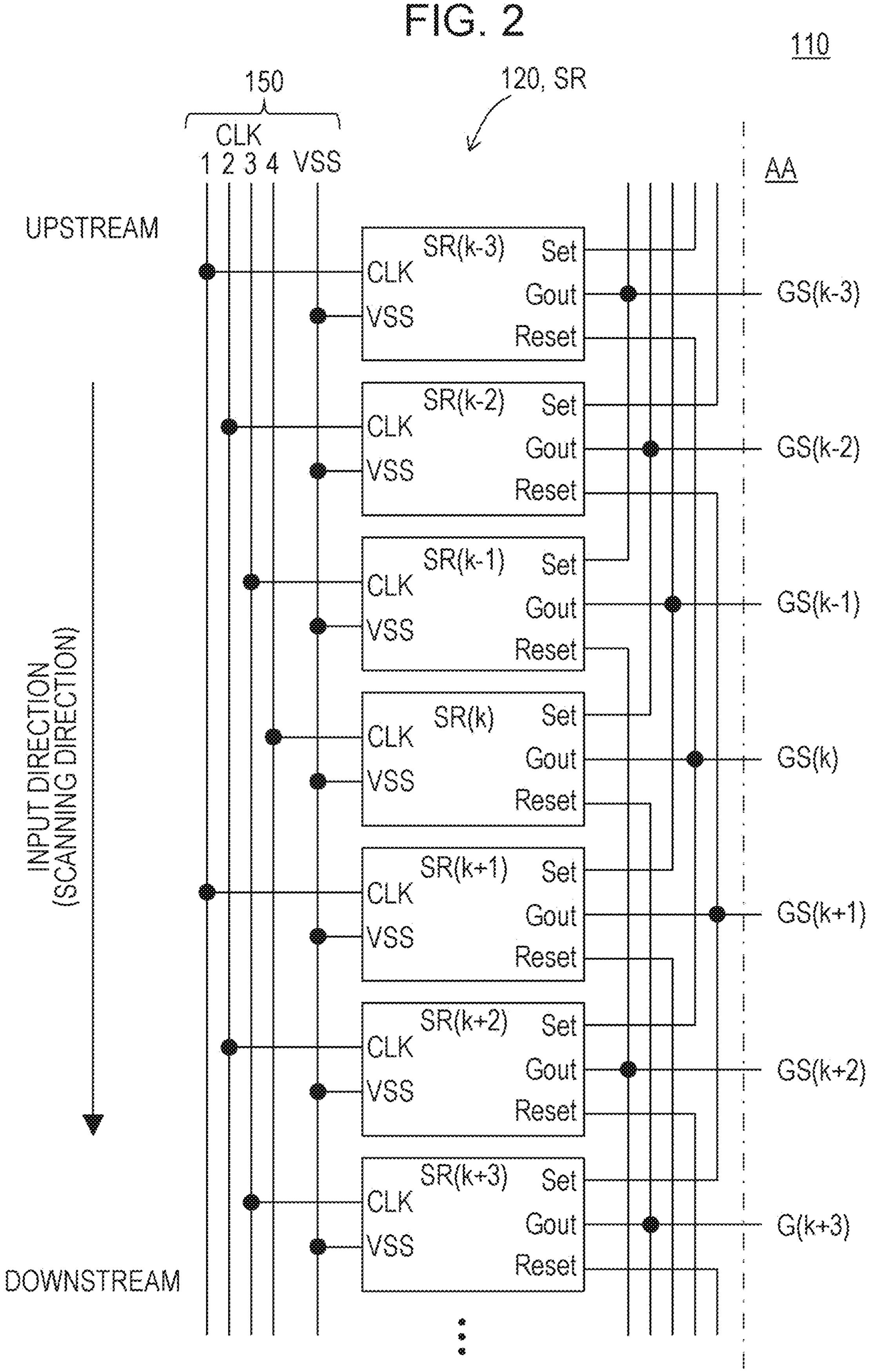
FIG. 2 is a schematic diagram illustrating a circuit configuration for outputting a gate scanning signal.

Reference is now made to FIG. 2. FIG. 2 is a schematic diagram illustrating a circuit configuration for outputting the gate scanning signal GS.

The GOA gate driving circuit 120 includes a shift register circuit SR, and the shift register circuit SR includes a plurality of stages (also referred to as a unit circuit or a shift circuit).

A plurality of input signals are supplied to the gate driving circuit 120 from the control circuit (not illustrated) via a plurality of input signal lines 150. The input signals are the clock signals CLK1, 2, 3, and 4 and a reference voltage signal Vss, and the respective input signal lines may be referred to as the clock signal lines CLK1, 2, 3, and 4 and a reference voltage signal line Vss. The clock signal CLK, the reference voltage signal Vss, a Set signal, and a Reset signal are input to each stage of the shift register circuits SR. Signals generated in other stages are used as the Set signal and the Reset signal. The gate scanning signal GS is output from each stage of the shift register circuits SR to the gate bus line GB corresponding to each pixel row. In FIG. 2, a gate signal corresponding to a k-th pixel row is represented by GS (k), and a k-th stage of the shift register circuit SR is represented by SR (k).

The gate driving circuit 120 is configured to sequentially apply the gate-on pulse GOP to the plurality of gate bus lines GB in the scanning direction in response to an input signal. The scanning direction is typically a direction from a first pixel row located at the top of the active area AA toward a pixel row located at the bottom, as illustrated in FIG. 2. A side close to the control circuit (for example, a timing controller, not illustrated) of the input signal lines 150 is referred to as upstream, and a side far from the control circuit is referred to as downstream. Input signals flow through the input signal lines 150 from upstream to downstream. A direction in which the input signals flow through the input signal lines 150 is referred to as an input direction of the input signals. Here, a case where the input direction of the input signals follows the scanning direction is exemplified, but the embodiment of the present disclosure is not limited thereto, and a case where the input direction of the input signal does not follow the scanning direction is also included. For example, when the input signals are input from both upper and lower ends of the active area AA toward the center, the upper and lower ends of the active area AA are upstream (most upstream, upstream end), and the center of the active area AA is downstream (most downstream, downstream end).

Figure 3:
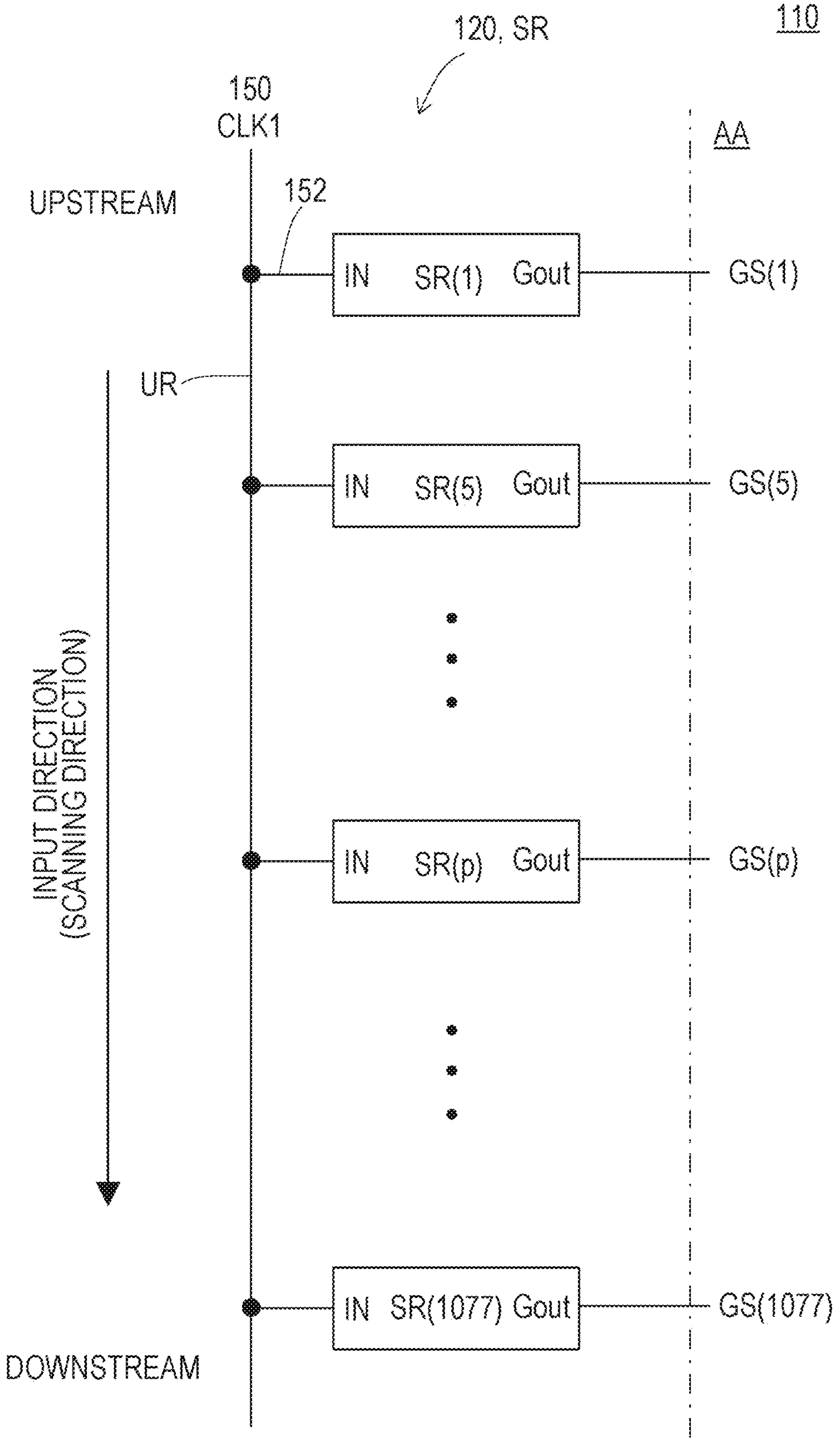
FIG. 3 is a schematic diagram illustrating a connection relationship between one input signal line and each stage of shift register circuits.

Reference is now made to FIG. 3. FIG. 3 is a schematic diagram illustrating a connection relationship between one input signal line 150 and each stage of the shift register circuits SR. Here, a connection relationship between the clock signal line CLK1 and each stage of the shift register circuits SR illustrated in FIG. 2 is illustrated.

Each of the plurality of stages of the shift register circuits SR includes an input terminal (IN) connected to one of the plurality of input signal lines 150 via a branch line 152, and an output terminal (Gout) connected to one of the plurality of gate bus lines GB. When a unit portion of the input signal line 150 between the adjacent branch lines 152 is defined as UR, the input signal line 150 has a plurality of unit portions UR.

Figure 5A:
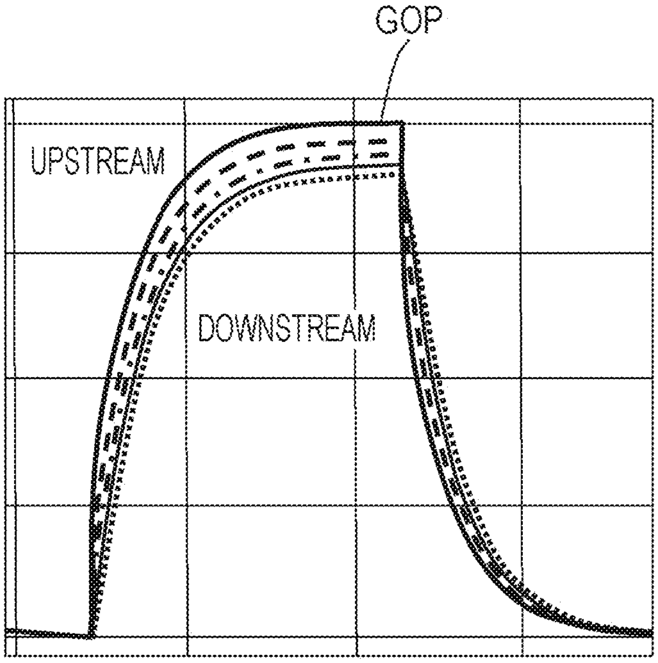
FIG. 5A is a graph showing a pulse waveform of the gate-on pulse in a conventional liquid crystal display device.

A plurality of input signal lines in the conventional GOA liquid crystal display device are formed of conductive layers having a fixed line width from upstream to downstream, a resistance value per unit length is fixed, and each unit portion UR has a fixed resistance value. Therefore, an input signal is affected by the resistance corresponding to the length of the input signal line until the input signal reaches the downstream of the input signal line, resulting in the input signal being attenuated and/or delayed. The further upstream the input signal line is located, the larger the current value is, because the further upstream the input signal line is located, the more paths for input signals to the stages of the shift registers there are. The further upstream the input signal line is located, the larger attenuation and/or delay of the input signal is, because the voltage drop and the Joule heat are larger with a larger current value. Further, the further upstream the input signal line is located, the larger non-uniformity of the temperature distribution of the liquid crystal display device is, because the further upstream the input signal line is located, the larger the Joule heat is. For example, the gate-on pulse output from the gate driving circuit has a significantly different pulse waveform between an upstream side and a downstream side as illustrated in the FIG. 5A. The difference in the pulse waveforms of the gate-on pulses affects display. For example, when a uniform halftone is displayed in the entire display area, brightness unevenness occurs, that is, the brightness is higher on the upstream side and the brightness is lower on the downstream side. Further, since the change of the pulse waveform is larger on the upstream side than on the downstream side, the brightness unevenness is larger (steeper) on the upstream side and less conspicuous (gentler) on the downstream side. Since the characteristics of the TFT are affected by temperature, the deterioration in the display quality due to the non-uniformity of a temperature distribution is also likely to be apparent on the upper side of the display area.

The liquid crystal display device 100 according to the embodiment of the present disclosure reduces the resistance of an input wiring line on the upstream side to suppress the change of the pulse waveform of the gate-on pulse and/or the non-uniformity of the temperature distribution of the liquid crystal display device, resulting in suppression of the deterioration in the display quality caused by the increase in wiring line resistance.

Figure 4A:
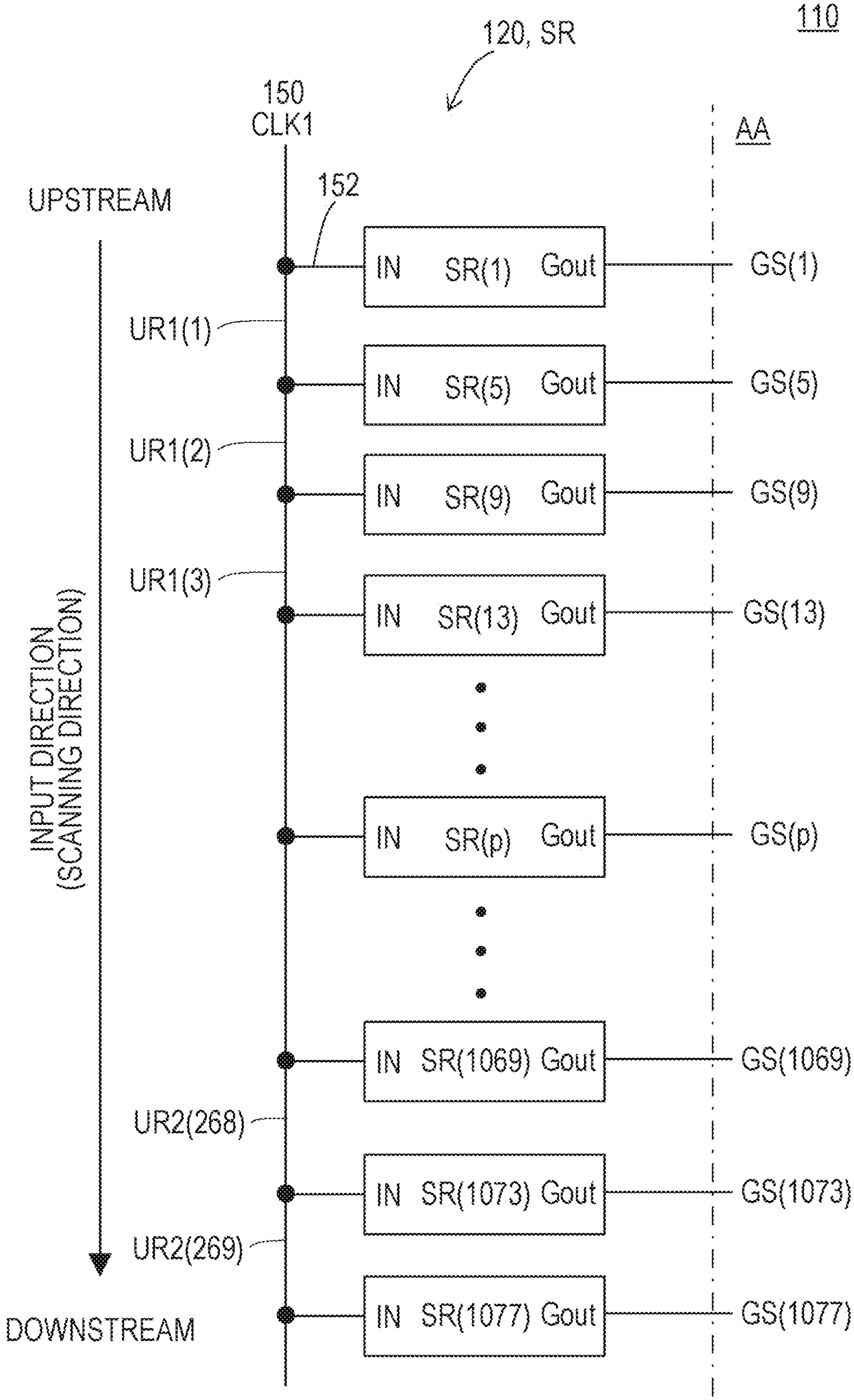
FIG. 4A is a schematic diagram illustrating a connection relationship between one input signal line and each stage of the shift register circuits in the liquid crystal display device.

Reference is now made to FIG. 4A. FIG. 4A is a schematic diagram illustrating a connection relationship between one input signal line 150 and each stage of the shift register circuits SR in the liquid crystal display device 100 according to an embodiment of the present disclosure. FIG. 4A illustrates a connection relationship between the clock signal line CLK1 and each stage of the shift register circuits SR as illustrated in FIG. 2, similarly to FIG. 3. The plurality of unit portions UR included in the input signal line 150 include a plurality of first unit portions UR1 having a resistance value smaller than a resistance value of the unit portion UR adjacent thereto on the downstream side in the input direction. The first unit portions UR1 having a smaller resistance value are located further upstream in the input direction. As illustrated in FIG. 4A, the input signal line 150 may include the first unit portions UR1 on the upstream side and at least one second unit portion (typically a plurality of second unit portions) UR2 on the downstream side, which have the same resistance value as the unit portion adjacent thereto on the downstream side. Further, the input signal line 150 may have more of the first unit portion UR1 in an upstream portion from a center of an upstream end and a downstream end to the upstream end in the input direction than in a downstream portion from the center of the upstream end and the downstream end to the downstream end in the input direction.

The unit portions UR located on the upstream side in the input direction among the plurality of unit portions UR are the first unit portions UR1 having a smaller resistance value as the unit portions UR are located on the upstream side. In other words, the resistance value of the first unit portion UR1(1) located most upstream is smaller than the resistance value of the first unit portion UR1(2) located downstream of UR1(1), and the resistance value of the first unit portion UR1(2) is smaller than the resistance value of the first unit portion UR(3) located downstream of UR1(2). The input signal line 150 may have this relationship up to the unit portion UR located most downstream. In this case, the difference in resistance value between the unit portion UR1 adjacent on the upstream side and the unit portion UR1 adjacent on the downstream side may be increased toward the upstream side. The second unit portion UR2 (268) in FIG. 4A has the same resistance value as the second unit portion UR2 (269).

Figure 4B:
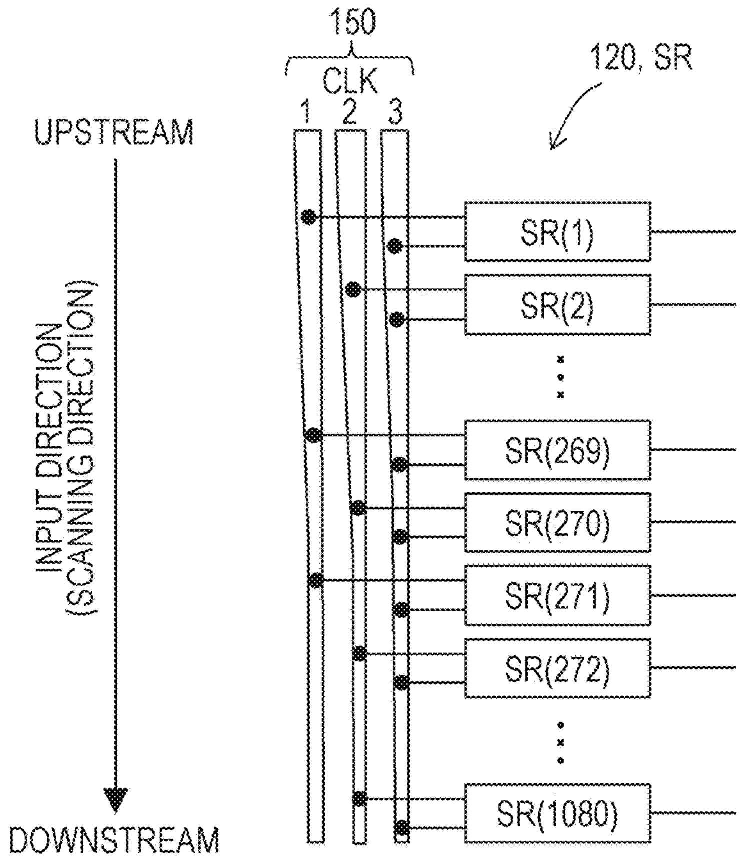
FIG. 4B is a schematic diagram illustrating a connection relationship between three input signal lines and each stage of the shift register circuit.

The difference in resistance value may be adjusted by, for example, varying line widths of the conductive layer forming the input signal line 150, as illustrated in FIG. 4B. Each of the plurality of first unit portions UR1 may be formed to have a portion having a line width larger than the line widths of the unit portions UR adjacent thereto on the downstream side. For example, the first unit portion UR1 may be formed so as to have a portion with a line width larger than the maximum line width of the unit portion adjacent thereto on the downstream side and not to have a portion with a line width smaller than the maximum line width of the unit portion adjacent thereto on the downstream side. The first unit portion UR1 may have a portion whose line width becomes narrower toward the downstream side. Further, the line width of the input signal line 150 may be continuously and gradually reduced from the most upstream side to the most downstream side. Alternatively, the lengths of the unit portions UR may be varied to adjust the resistance values. Also, both the line width and the line length may be varied to adjust the resistance value.

Figure 4C:
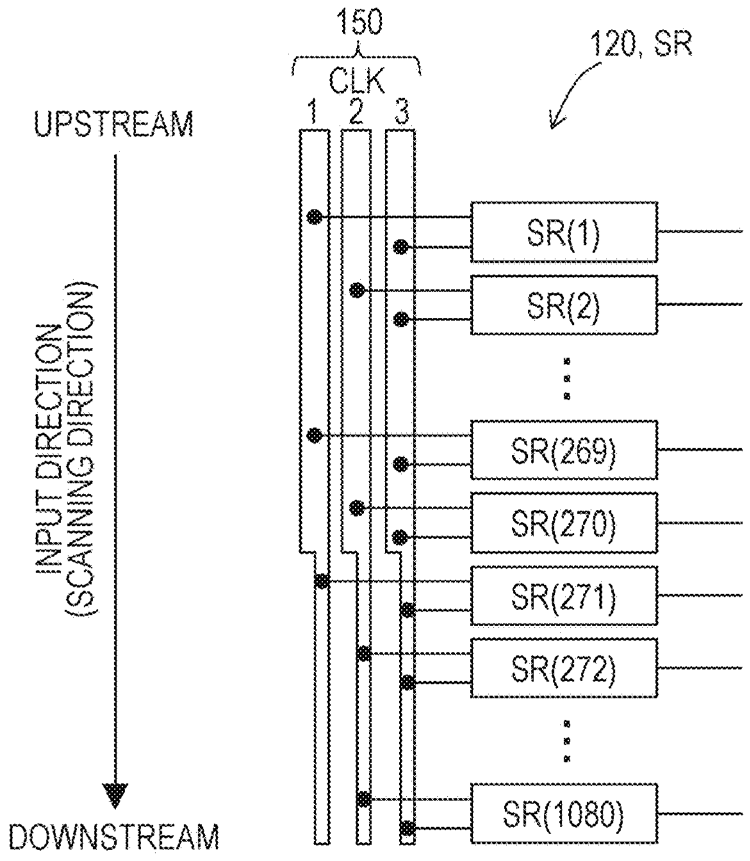
FIG. 4C is a schematic diagram illustrating a connection relationship between three input signal lines and each stage of the shift register circuit.

As illustrated in FIG. 4C, the line width of each of the unit portions UR may be set to be fixed and be reduced in a stepped manner to adjust the resistance values. A fixed line width of each unit portion UR may improve the accuracy of patterning of the conductive layer as compared with making the line width continuously and gradually smaller. Further, the fixed line width may allow easier inspection of the conductive layer for patterning defects.

Figure 5B:
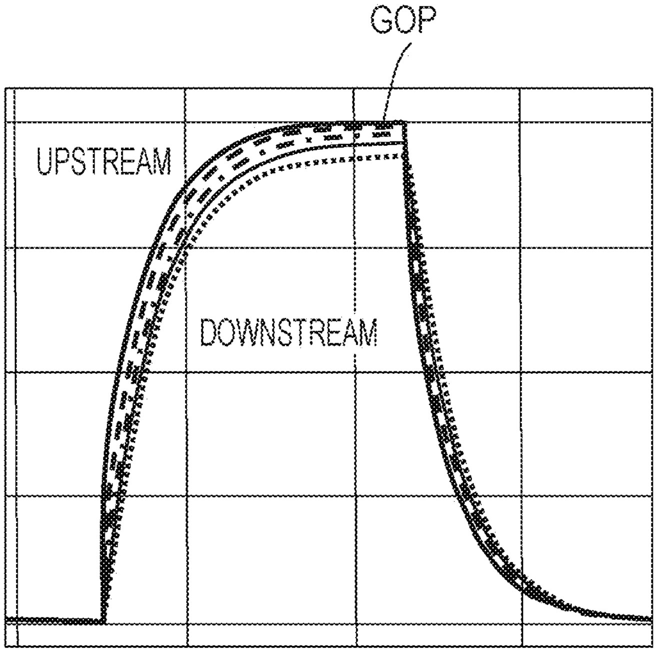
FIG. 5B is a graph showing a pulse waveform of the gate-on pulse in the liquid crystal display device.

By varying the resistance value of the input signal line 150 in this way, for example, in the gate-on pulse output from the gate driving circuit, as illustrated in FIG. 5B, the difference in pulse waveform between the upstream side and the downstream side may be suppressed. As can be seen from a comparison with FIG. 5A, in FIG. 5B the difference in waveform particularly on the upstream side may be suppressed, and the difference in pulse waveform between adjacent pixel rows (for example, the difference between adjacent waveforms in FIG. 5B) may be made uniform over an entire panel. In other words, in the liquid crystal display device 100 according to the embodiment of the present disclosure, a decrease in display quality due to an increase in resistance value of the input signal line 150 may be suppressed.

In the above description, the clock signal line CLK1 is exemplified as the input signal line 150, but the same description of the input signal line 150 may be applied to all the clock signal lines CLK1 to 4. Further, the description of the input signal line 150 may be applied to the reference voltage signal line Vss instead of the clock signal lines CLK1 to 4, or may be applied to both the clock signal lines CLK1 to 4 and the reference voltage signal line Vss. The arrangement of the input signal lines 150 is not limited to the example illustrated in FIG. 2.

In the active matrix liquid crystal display device, a timing of applying the gate-on pulse GOP may match a timing of supplying the source signal. If the gate-on pulse GOP is delayed, a difference occurs between the timing of applying the gate-on pulse GOP and the timing of supplying the source signal. If the difference in timing is different for each pixel row, it is visually recognized as deterioration in display quality. In order to suppress such deterioration, a method for intentionally slightly shifting the timing of applying the gate-on pulse GOP and the timing of supplying the source signal is known. However, as described above, if the delay difference in the gate-on pulse GOP between the adjacent pixel rows is largely different for each pixel row, for example, the delay difference is larger on the upstream side than on the downstream side in the input direction, it is difficult to make the difference between the timing of applying the gate-on pulse GOP and the timing of supplying the source signal uniform regardless of the pixel row because complicated timing adjustment may be used. In the above way, it is difficult to effectively suppress the deterioration in the display quality. The liquid crystal display device 100 according to the embodiment of the present disclosure may suppress the variation in the delay of the gate-on pulse GOP and make the delay difference between the adjacent pixel rows uniform over the panel. Therefore, since the complicated timing adjustment is not used, it is possible to effectively suppress the difference between the timing of applying the gate-on pulse GOP and the timing of supplying the source signal from becoming excessive.

Although the GOA liquid crystal display device has been exemplified above, the present disclosure is not limited thereto, and the active matrix display device according to the embodiment of the present disclosure may be another display device such as an electrophoretic display device having, for example, an electrophoretic display layer as a display medium layer. Further, a method of selecting a pixel row is not limited to the TFT type, and may be a method using other switching elements.

The display device according to the embodiment of the present disclosure can be suitably used for a display device that is large and/or has a higher resolution and improve the display quality.

Embodiments of the present disclosure provide solutions described in the following items.

[Item 1]

A display device comprising:

a plurality of pixels arranged in a matrix having a plurality of pixel rows and a plurality of pixel columns;

a plurality of scanning signal lines each of which is associated with one of the plurality of pixel rows;

a plurality of display signal lines each of which is associated with one of the plurality of pixel columns;

a scanning signal line driving circuit that supplies a scanning signal including a selecting pulse for selecting one of the plurality of pixel rows to the plurality of scanning signal lines;

a display signal line driving circuit that supplies a display signal to the plurality of display signal lines; and a plurality of input signal lines that supply an input signal to the scanning signal line driving circuit, wherein the scanning signal line driving circuit includes a shift register circuit, the shift register circuit includes a plurality of stages, each of the plurality of stages includes an input terminal connected to one of the plurality of input signal lines via a branch line and an output terminal connected to one of the plurality of scanning signal lines, the scanning signal line driving circuit is configured to sequentially apply the selecting pulse to the plurality of scanning signal lines in a scanning direction in response to the input signal, the scanning signal line driving circuit and the plurality of input signal lines are formed on a same substrate as the plurality of scanning signal lines, and at least one input signal line of the plurality of input signal lines includes a plurality of unit portions when a portion between adjacent branch lines, each of which being the branch line connecting the input terminal to the one of the plurality of input signal lines, is defined as a unit portion, and the plurality of unit portions include at least one first unit portion each having a resistance value smaller than a resistance value of the unit portion adjacent thereto on a downstream side in an input direction of the input signal.

[Item 2]

The display device according to Item 1, wherein the at least one first unit portion includes a plurality of first unit portions, and the first unit portion having a smaller resistance value is located further upstream in the input direction.

[Item 3]

The display device according to Item 1 or 2, wherein the at least one first unit portion has a portion having a line width larger than a line width of a unit portion adjacent thereto on the downstream side in the input direction.

[Item 4]

The display device according to any one of Items 1 to 3, wherein the plurality of unit portions include at least one second unit portion each having a resistance value equal to a resistance value of a unit portion adjacent thereto on the downstream side in the input direction.

[Item 5]

The display device according to any one of Items 1 to 4, wherein each of the plurality of unit portions has a fixed line width.

[Item 6]

The display device according to any one of Items 1 to 5, wherein the at least one input signal line has more of the first unit portion in an upstream portion from a center of an upstream end and a downstream end to the upstream end in the input direction than in a downstream portion from the center of the upstream end and the downstream end to the downstream end in the input direction.

[Item 7]

The display device according to any one of Items 1 to 4 and 6, wherein the at least one first unit portion has a portion, a line width of which decreases toward the downstream side in the input direction.

[Item 8]

The display device according to any one of Items 1 to 7, wherein each of the plurality of pixels includes a display medium layer, a pair of electrodes facing each other via the display medium layer, and a TFT having a drain electrode connected to one of the pair of electrodes, the plurality of scanning signal lines are a plurality of gate bus lines and the plurality of display signal lines are a plurality of source bus lines, a gate electrode of the TFT is connected to a gate bus line associated with a pixel row including a pixel having the TFT, and a source electrode of the TFT is connected to a source bus line associated with a pixel column including a pixel having the TFT, the scanning signal line driving circuit is a gate driving circuit, the scanning signal is a gate scanning signal including, as the selecting pulse, a gate-on pulse for turning on the TFT, and the display signal line driving circuit is a source driving circuit, and the display signal is a source signal.

[Item 9]

The display device according to Item 8, wherein the display medium layer is a liquid crystal layer.

The present disclosure contains subject matter related to that disclosed in Japanese Priority Patent Application JP 2023-138101 filed in the Japan Patent Office on Aug. 28, 2023, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display device comprising:

a plurality of pixels arranged in a matrix having a plurality of pixel rows and a plurality of pixel columns;

a plurality of scanning signal lines each of which is associated with one of the plurality of pixel rows;

a plurality of display signal lines each of which is associated with one of the plurality of pixel columns;

a scanning signal line driving circuit that supplies a scanning signal, including a selecting pulse for selecting one of the plurality of pixel rows, to the plurality of scanning signal lines;

a display signal line driving circuit that supplies a display signal to the plurality of display signal lines; and a plurality of input signal lines that supplies an input signal to the scanning signal line driving circuit, wherein the scanning signal line driving circuit includes a shift register circuit, the shift register circuit includes a plurality of stages, each of the plurality of stages includes an input terminal connected to one of the plurality of input signal lines via a branch line and an output terminal connected to one of the plurality of scanning signal lines, the scanning signal line driving circuit is configured to sequentially apply the selecting pulse to the plurality of scanning signal lines in a scanning direction in response to the input signal, the scanning signal line driving circuit and the plurality of input signal lines are formed on a same substrate as the plurality of scanning signal lines, at least one input signal line of the plurality of input signal lines includes a plurality of unit portions, each unit portion being a portion between adjacent branch lines, among a plurality of branch lines, each connected to the at least one input signal line, the plurality of unit portions includes at least one first unit portion, each having a resistance value smaller than a resistance value of a unit portion adjacent thereto on a downstream side in an input direction of the input signal, and the at least one first unit portion includes a plurality of first unit portions, and a first unit portion, among the plurality of first unit portions, having a smaller resistance value is located further upstream in the input direction.

2. The display device according to claim 1, wherein the at least one first unit portion has a portion having a line width larger than a line width of the unit portion adjacent thereto on the downstream side in the input direction.

3. The display device according to claim 1, wherein the plurality of unit portions further includes at least one second unit portion, each having a resistance value equal to a resistance value of a unit portion adjacent thereto on the downstream side in the input direction.

4. The display device according to claim 1, wherein each of the plurality of unit portions has a fixed line width.

5. The display device according to claim 1, wherein the at least one input signal line has more of first unit portions in an upstream portion from a center of an upstream end and a downstream end to the upstream end in the input direction than in a downstream portion from the center of the upstream end and the downstream end to the downstream end in the input direction.

6. The display device according to claim 1, wherein the at least one first unit portion has a portion, a line width of which decreases toward the downstream side in the input direction.

7. The display device according to claim 1, wherein each of the plurality of pixels includes a display medium layer, a pair of electrodes facing each other via the display medium layer, and a thin-film transistor (TFT) having a drain electrode connected to one of the pair of electrodes, the plurality of scanning signal lines is a plurality of gate bus lines and the plurality of display signal lines is a plurality of source bus lines, a gate electrode of the TFT is connected to a gate bus line associated with a pixel row that includes a pixel having the TFT, and a source electrode of the TFT is connected to a source bus line associated with a pixel column that includes the pixel having the TFT, the scanning signal line driving circuit is a gate driving circuit, the scanning signal is a gate scanning signal that includes, as the selecting pulse, a gate-on pulse for turning on the TFT, and the display signal line driving circuit is a source driving circuit, and the display signal is a source signal.

8. The display device according to claim 7, wherein the display medium layer is a liquid crystal layer.

9. The display device according to claim 1, wherein the at least one first unit portion includes a segment having a line width greater than a maximum line width of a unit portion adjacent thereto on a downstream side in the input direction, and includes no segment having a line width less than the maximum line width of the unit portion adjacent thereto on a downstream side in the input direction.

* * * * *